US 009917816 B2

(12) United States Patent
Wu

(10) Patent No.: US 9,917,816 B2
(45) Date of Patent: *Mar. 13, 2018

(54) PEOPLE DIRECTORY WITH SOCIAL PRIVACY AND CONTACT ASSOCIATION FEATURES

(71) Applicant: Facebook, Inc., Menlo Park, CA (US)

(72) Inventor: Charles Chu-Shin Wu, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/392,538

(22) Filed: Dec. 28, 2016

(65) Prior Publication Data

US 2017/0111327 A1 Apr. 20, 2017

Related U.S. Application Data

(63) Continuation of application No. 12/857,192, filed on Aug. 16, 2010, now Pat. No. 9,553,878.

(51) Int. Cl.
*G06F 7/04* (2006.01)
*H04L 29/06* (2006.01)
*G06Q 50/00* (2012.01)

(52) U.S. Cl.
CPC ......... *H04L 63/0421* (2013.01); *G06Q 50/01* (2013.01); *H04L 63/107* (2013.01)

(58) Field of Classification Search
CPC .............................. H04W 12/00; H04W 12/02
USPC ...................................................... 726/26–30
See application file for complete search history.

(56) References Cited

U.S. PATENT DOCUMENTS

| 8,226,485 | B1 * | 7/2012 | Mooney ............... A63F 13/12 463/42 |
| 2002/0106066 | A1 * | 8/2002 | Swanson ........... H04M 3/42008 379/196 |
| 2003/0043981 | A1 * | 3/2003 | Lurie .................... H04M 15/00 379/114.25 |
| 2005/0193054 | A1 * | 9/2005 | Wilson .................. G06Q 30/02 709/200 |
| 2006/0224675 | A1 * | 10/2006 | Fox ........................ G06Q 10/00 709/206 |
| 2008/0205655 | A1 * | 8/2008 | Wilkins ................. G06Q 10/10 380/279 |
| 2008/0256602 | A1 * | 10/2008 | Pagan ................... H04L 12/581 726/3 |
| 2009/0019517 | A1 * | 1/2009 | Turakhia ............. G06F 21/6218 726/1 |
| 2010/0174709 | A1 * | 7/2010 | Hansen ............... G06F 17/3087 707/728 |

(Continued)

OTHER PUBLICATIONS

Buchegger et al., "A case for P2P infrastructure for social networks—opportunities & challenges," Wireless On-Demand Network Systems and Services, 2009. WONS 2009. Sixth International Conference on Year: 2009 pp. 161-168.*

(Continued)

*Primary Examiner* — Roderick Tolentino
(74) *Attorney, Agent, or Firm* — Baker Botts L.L.P.

(57) ABSTRACT

In one embodiment, a social networking system provides people look up service and establish anonymous communication session between users; creates contact association for future communication between users; and configures one or more privacy settings for users.

20 Claims, 6 Drawing Sheets

(56) References Cited

U.S. PATENT DOCUMENTS

2010/0246576 A1* 9/2010 Bustamente ...... H04L 29/12594
370/389
2010/0280904 A1* 11/2010 Ahuja .................... G06Q 30/02
705/14.58
2010/0287050 A1* 11/2010 Jones ..................... G06Q 30/02
705/14.58
2010/0306099 A1* 12/2010 Hirson ................... G06Q 20/10
705/38
2011/0125845 A1* 5/2011 Mo ....................... H04L 12/588
709/204

OTHER PUBLICATIONS

Zolfaghar et al., "Mining trust and distrust relationships in social Web applications," Intelligent Computer Communication and Processing (ICCP), 2010 IEEE International Conference on Year: 2010 pp. 73-80.*
Canadian Office Action for CA Application No. 2,808,300, dated May 19, 2017.
Notice of Reasons for Rejection for JP Patent Application 2013-524873, Feb. 28, 2017.
European Communication Pursuant to ARticle 94(3) EPC for EP Application 11 818 580.0-1958, dated Aug. 4, 2017.

* cited by examiner

PEOPLE DIRECTORY WITH SOCIAL PRIVACY AND CONTACT ASSOCIATION FEATURES

RELATED APPLICATIONS

This application is a continuation under 35 U.S.C. § 120 of U.S. patent application Ser. No. 12/857,192, filed 16 Aug. 2010, which is incorporated herein by reference.

TECHNICAL FIELD

The present disclosure generally relates to providing a person directory and look up service having social privacy and contact association features.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, personal interests and user's interaction with other users within the social networking system. The social networking system may also create and store records of user's events, for example, a social event the user is planning to attend. Meanwhile, a user may control whether his information is shared with others by configuring privacy settings associated with a user profile and event information.

Directories of information related to people are known. In addition, the Lightweight Directory Access Protocol is an application protocol for querying and modifying data using directory services. A directory can be a set of objects with attributes organized in a logical and hierarchical manner. A simple example is the telephone directory, which consists of a list of names (of either persons or organizations) organized alphabetically, with each name having an address and phone number associated with it.

SUMMARY

The present disclosure generally relates to a people directory and contact look up service. In some implementations, the people directory and contact look up service allows users to establish communication sessions, create contact associations for future communications between users, and/or configure privacy settings having social and spatiotemporal aspects for access to contact information. These and other features, aspects, and advantages of the disclosure are described in more detail below in the detailed description and in conjunction with the following figures.

DETAILED DESCRIPTION

Figure 1:
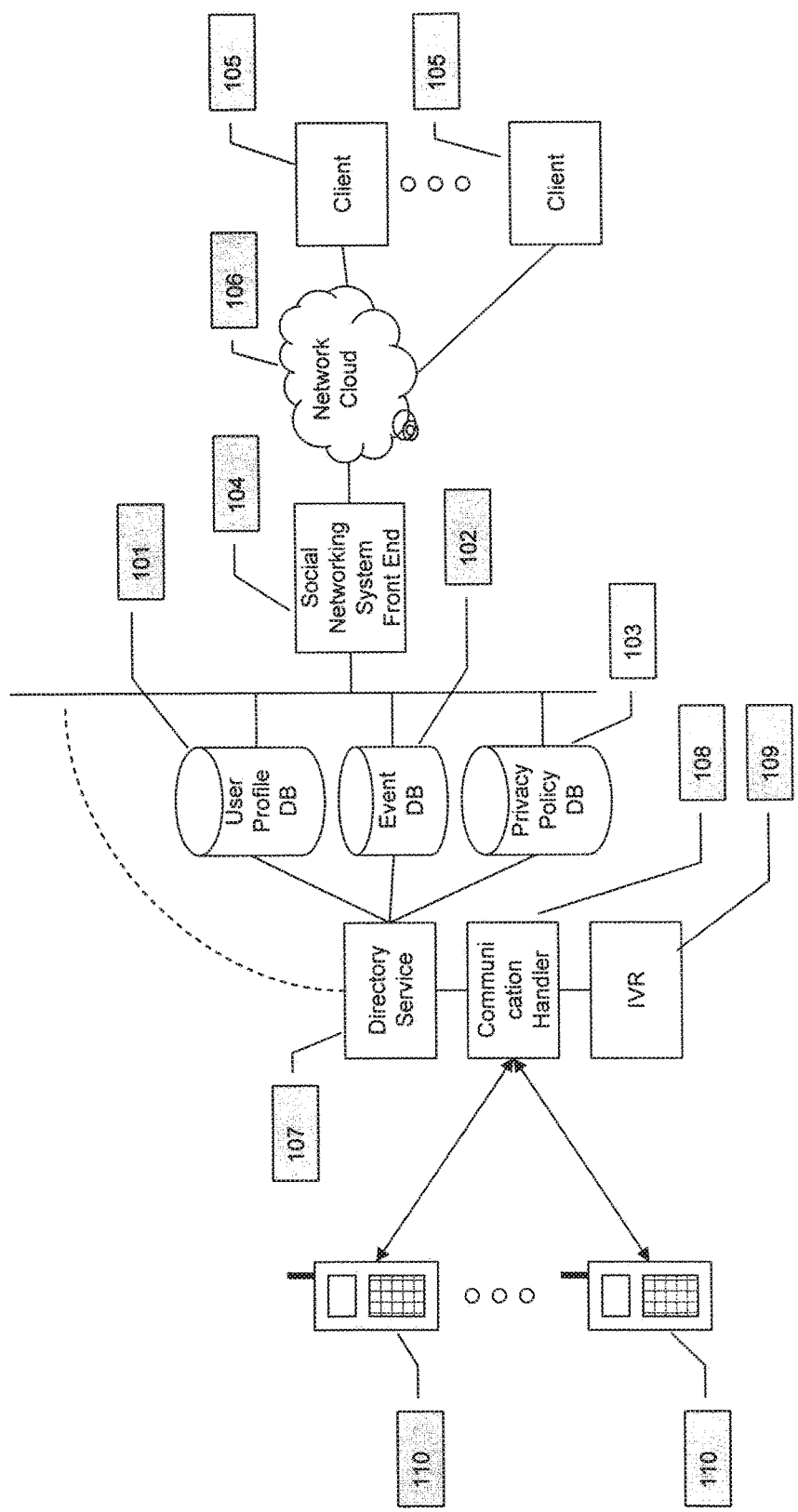
FIG. 1 illustrates an example system of a social networking system and its directory service

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user first registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts.

In addition to user profile information, the social networking system may track or maintain other information about the user. For example, the social networking system may host one or more location-based services that record the user's location. For example, users may access the social networking system using a special-purpose client application hosted by a mobile device of the user. The client application may automatically access Global Positioning System (GPS) or other geo-location functions supported by the mobile device and report the user's current location to the social networking system. In addition, the client application may support geo-social networking functionality that allows users to check-in at various locations and communicate this location to other users. The user may also add, delete or update events that the user is associated with. For example, a user may update a social event associated with a time and date that the user is planning to attend, or make comments in his wall-posts about a past event he attended.

On the other hand, a user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user. The privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item indexable and searchable on the Internet). A user may choose a default privacy setting for all user data that is to be posted. Additionally, a user may specifically exclude certain entities from viewing a user datum or a particular type of user data. In addition, a user may also configure one or more privacy settings that control the accessibility of one or more aspects of its communication channel information, such as a phone number or email address. For example, a user may configure a privacy setting that allows only first degree contacts access to the user's cell phone number, while allowing second degree (e.g., friends of friends) access to a user's email address. Privacy settings that control the accessibility of one or more aspects of a user's communication channel information may also have a dynamic, location-based aspect that considers the proximity in time and location with respect to the user. For example, a user may configure a privacy setting that allows access to the user's email address only for other users who had attended the same event as the user within the past 3 months. As an additional example, a user may configure a privacy setting that allows access to the user's cell phone number only for other users who are within a 10-mile radius of the user's current location. In sum and as a non-limiting example, social networking system may allow users to control access to information along one or more of the following categories: 1) specific users, contacts or friends, 2) degrees of separation (e.g., $1^{st}$ degree, $2^{nd}$ degree or all), 3) past shared history (same company, same school, same hometown), 4) age (e.g., one user being within a threshold age range of another user), 5) political or other group affiliation, 6) interests, 7) events attended, and 8) current location of residence or presence.

Additionally, social networking system may provide various communication channels for users to interact with each other. Thus, users of a social networking system may interact with each other by sending content items of various types of media through the communication channels. In particular embodiments, communication channels may include, but are not limited to, email, instant messaging, text, voice or video chat, and wall posts. Social networking system may also maintain external address information, such as external electronic email addresses, phone number and physical address (e.g., "1000 Main Street, San Francisco, Calif."). To facilitate user interaction and increase further engagement with the social networking system, social networking systems generally provide a directory service for looking up registered users within the social networking system and providing contact information to allow a requesting user to reach a target user through a given communication channel. A social networking system may make the directory service available outside the social networking system.

FIG. 1 illustrates an example social networking system and its directory service. In particular embodiments, the social networking system may store user profile data in user profile database 101. In particular embodiments, the social networking system may store user event data in event database 102. In particular embodiments, the social networking system may store user privacy policy data in privacy policy database 103. In particular embodiments, databases 101, 102 and 103 may be operably connected to the social networking system's front end 104. In particular embodiments, the front end 104 may interact with client device 105 through network cloud 106. Client device 105 is generally a computer or computing device including functionality for communicating (e.g., remotely) over a computer network. Client device 105 may be a desktop computer, laptop computer, personal digital assistant (PDA), in- or out-of-car navigation system, smart phone or other cellular or mobile phone, or mobile gaming device, among other suitable computing devices. Client device 105 may execute one or more client applications, such as a web browser (e.g., Microsoft Windows Internet Explorer, Mozilla Firefox, Apple Safari, Google Chrome, and Opera, etc.), to access and view content over a computer network. Front end 104 may include web or HTTP server functionality, as well as other functionality, to allow users to access the social networking system. Network cloud 106 generally represents a network or collection of networks (such as the Internet or a corporate intranet, or a combination of both) over which client devices 105 may access social network system.

A social network system may maintain social graph information, which can be generally defined by the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

In particular embodiments, directory service 107 may be connected with databases 101, 102 and 103. In particular embodiments, directory service 107 may provide a people lookup service based on user profile data, event data, and privacy policy settings of registered users within the social networking service. In particular embodiments, directory service 107 may provide a people lookup service through social networking system front end 104. In particular embodiments, directory service 107 may provide a people lookup service through communication handler 108 and/or interactive voice response system 109 for voice communication with mobile device 110. In particular embodiments, mobile device 110 may be a device capable of voice communication (e.g., a phone, or a personal computer).

Users may access directory service 107 to search for communication channel information associated with one or more target users. A user can identify a target user by first and last name. In the case where the information provided by the user resolves to more than one candidate target user, directory service 107 may select from among the search candidates based on whom the initiating user is more likely to know, for example, friends of friends, or users in the same social networks (e.g., same university, same city, or attending the same concert). In other words, the directory service 107 may evaluate the overlap between a first search using names and other information as key words and a second search that evaluates a social graph including contacts between users. For example, the social networking system may create the list of search candidates who a user is likely to know based on user connection information maintained in a social graph. A search process that access the social graph against the requesting user may generate a list of candidates that a user is likely to know by computing the probability that the user will positively convert a connection suggestion into a connection. The probability computation may be based on factors including, but not limited to, degrees of separation in the social graph, demographic information (e.g., number of common friends, work history, school history, or location proximity), historical behavioral data (e.g., the number of times a candidate had accepted a request to connect), prior interaction data (e.g., a number of times a candidate had seen the user's video), privacy settings (e.g., a candidate may block connection requests from a certain social network group), and prior instruction data (e.g., a candidate may have had declined a similar connection request before). A suitable social graph search process is described more generally in U.S. Pat. Nos. 7,069,308, 7,188,153, and 7,451161 and which is hereby incorporated by reference in its entirety and for all purposes.

In particular embodiments, access to directory service 107 may operate in connection with a mobile directory service client application hosted on a mobile device 110. In some implementations, the mobile directory service client application can be a plug-in to an address book application installed on a mobile device 110. In particular embodiments, the directory service 107 may be accessible via a 3rd party software application (e.g., a web browser) hosted on mobile device 100. In particular embodiments, an initiating user may submit a people look up query by providing the directory service 107 1) identification information for a target user (e.g., first and last name, a registered user id, an email address, or a phone number), and 2) one or more types of communication channel information requested about the target user (e.g., an email address, a mobile phone number, or other phone number). In particular embodiments, the mobile directory service client application may communicate the query information provided by the initiating user to directory service 107, and directory service 107 may respond to the directory service query with information including, but not limited to, a NULL message (e.g., no target user information is found, or the initiating user does not have access to the target user's information), the target user's communication channel information as permitted by the target user's privacy settings, a confidence level indicator (e.g., confirmed if the target user's communication channel information is from first degree contacts, or unconfirmed if otherwise), and error codes (e.g., directory service 107 is not available). In particular embodiments, communication between the mobile directory service client application and directory service 107 may be implemented using the User Datagram Protocol (UDP). In addition, the response returned from directory service 107 may be in a JSON (JavaScript Object Notation) coded array. In other embodiments, communication between the mobile directory service client application and directory service 107 may be implemented in Short Message Service (SMS) protocol. In particular embodiments, the mobile directory service client application may be configured with a white list which authorizes access to the directory service 107 via the client application from certain 3rd party software applications also hosted on the mobile device 110. In particular embodiments, the target user may configure one or more privacy settings that authorize access to the target user's communication channel information for specific groups of users (e.g., friends only, friends of friends only, or specific networks only), and control what communication channel information (e.g., mobile phone number, or email addresses) can be made available to the mobile directory service client application. In various implementations, the client will establish a communications channel that includes the query, identity from the client and a server response. The encoding for query and response will be dependent on the devices and transmissions medium. Example embodiments may include using UDP (user datagram protocol) for connectionless results using simple key value encoding. Other embodiments may utilize SMS for the results or traditional web services technologies over HTTP. Certain embodiments may use a combination of the foregoing. The service described herein is independent of the communications channel technology.

Figure 2:
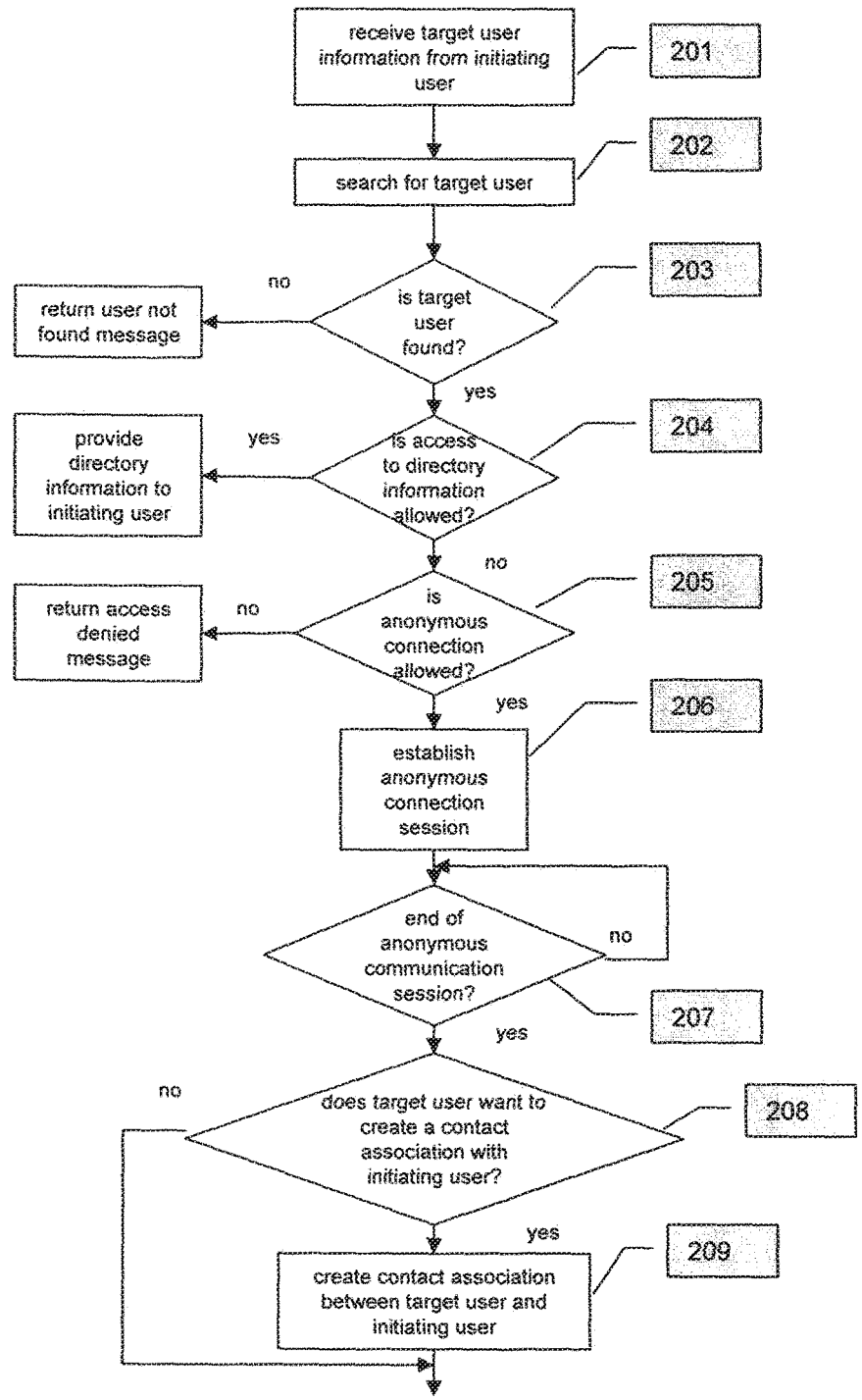
FIG. 2 illustrates an example method of people look up with contact association for future communication

FIG. 2 illustrates an example method implementing a directory service according to one possible implementation of the invention. In the disclosed embodiment, the social networking system provides a people look up service that includes a contact association mechanism that facilitates future communication between an initiating user and a target user. In particular embodiments, directory service 107 may receive a request from an initiating user for directory information of a target user (step 201). The request includes one or more informational attributes that directory service 107 may use to search for and identify the target user and/or to resolve access permissions for the initiating user. The request may also include identifying information of the initiating user to allow directory service 107 to identify the initiating user for the purpose of applying one or more of the privacy configuration rules associated with the target user. The information about the target user provided by the initiating user may include names, user profile information and/or event information (e.g., "John Smith in Los Angeles" or "Mary Williams whom I met in UC Berkeley campus visit in July 2009"). The initiating user may make the request from mobile device 110 or from client device 105. The initiating user may be or may not be a registered user within the social networking system. The request may also query the directory service for data relating to one or more communication channels associated with the target user—such as an email address, chat user identifier, a cell phone number, a physical address and the like.

In particular embodiments, directory service 107 may search for the target user (step 202). In particular embodiments, if directory service cannot find the target user, then directory service may return a "user not found" message to the initiating user (step 203). If directory service 107 finds the target user and access to the target user's directory information is allowed by the privacy settings of the target user, then directory service 107 may provide the target user's directory information to the initiating user (step 204). The directory service 107 may access the privacy configurations of the target user against the social and other attributes of the initiating user—such as whether the initiating user is a friend of the target user, the degree of separation between the target and initiating user, the residence locations of the target and initiating user, the groups or affiliations of the target and initiating user, the common interests of the target and initiating user, and the like—to determine whether to allow access to the communications channel information of the target user. For example, the target user may have configured a privacy contact setting that allows anyone that attended the same college to access one or more aspects of the target user's contact information, such as an email address or telephone number. The configurability of contact information privacy settings with the attributes discussed above allows for semi-public access to user directory information.

In particular embodiments, if access to the communications channel information of the target user and anonymous connection is not allowed by the privacy settings of the target user, then directory service 107 may return an "access denied" message to the initiating user. If anonymous connection is allowed by the privacy settings of the target user, then directory service 107 may establish an anonymous connection session between the target user and initiating user (step 205 and 206). The anonymous connection session may be in the form of anonymous phone call, anonymous email communication, and anonymous chat session, all of which may be mediated by directory service 107. As described above, directory service 107 may access the privacy configurations of the target user against the social and other attributes of the initiating user to determine whether to initiate an anonymous communications session. For example, the target user may configure one or more settings that allow users that are separated by two degrees of separation to contact the target user over an anonymous communications session. The privacy configuration settings may also include other attributes in addition to, or in lieu of, degrees of separation, such as current residence, events attended, interests, personal history (e.g., common education institutions or employers).

In particular embodiments, directory service 107 may determine whether the anonymous communication session has ended (step 207). In particular embodiments, after the anonymous communication session had ended, directory service 107 may formulate and provide the target user the option to create contact association for future communication between the target user and the initiating user (step 208). In particular embodiments, if the target user accepts the option, the social networking system may create contact association for future communication between the target user and the initiating user (step 209). For example, if directory service 107 mediates an anonymous phone call, directory service 107 may employ Interactive Voice Response (IVR) functionality 109 to query the user about various contact association options after the call has ended. Alternatively, directory service 107 may transmit an email to the target user with a form querying the user for various contact association options. Other communications channel manager functionality can be used to query users about contact association options, including SMS, chat and the like.

Figure 3:
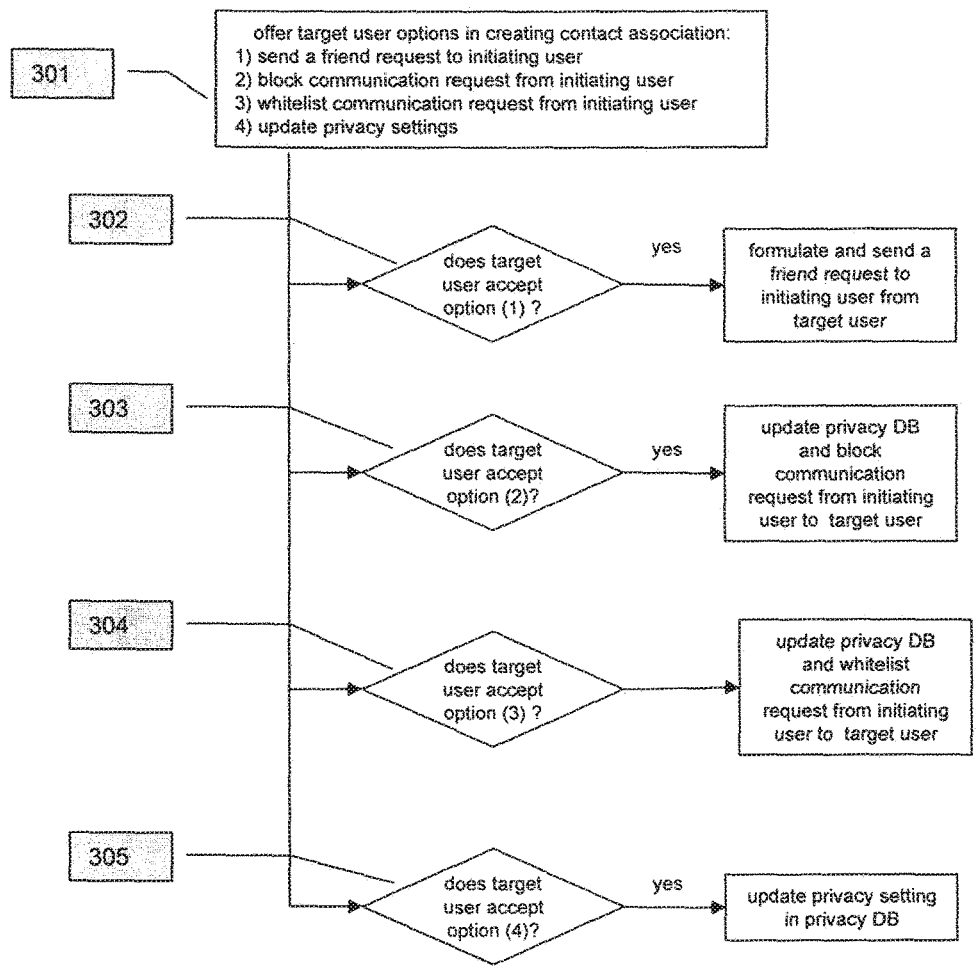
FIG. 3 illustrates an example method of creating contact associations for future communication between the target user and the initiating user

FIG. 3 illustrates an example method of creating a contact association for future communication between the target user and the initiating user. In particular embodiments, directory service 107 may offer the target user options to send a friend request to the initiating user, block future communication request from the initiating user, white list future communication request from the initiating user, or update privacy settings of the target user (step 301). In particular embodiments, if the target user selects the option to send a friend request to the initiating user, the social networking system may formulate and send a friend request to the initiating user from the target user (step 302). In particular embodiments, if the target user selects the option to block future communication request from the initiating user, then the social networking system may update the target user's privacy setting in privacy database 103 to block future communication request from the initiating user (step 303), such as by adding the initiating user to a black list. In particular embodiments, if the target user selects the option to white list future communication request from the initiating user, then the social networking system may add the initiating user to a white list associate with the target user, wherein the white list may authorize future direct communication sessions from the initiating user to the target user, or may authorize the initiating user's access to the target user's communication channel information (step 304).

In particular embodiments, one or more privacy settings define access parameters for the target user's communication channel information, user profile information and event information. For example, the target user may configure privacy settings to specifically block the initiating user from accessing certain communication channels, or may block the initiating user from accessing the target user's event information, or may block the initiating user from accessing the target user's wall posts but allow the initiating user for future communication in certain communication channels. In particular embodiments, if the target user accepts the option to update privacy settings, then the social networking system may formulate a privacy setting update mechanism (e.g., populate a web page with privacy setting parameters and present the web page to the target user) allowing the target user to update privacy settings in the privacy policy database 103 (step 305).

Figure 4:
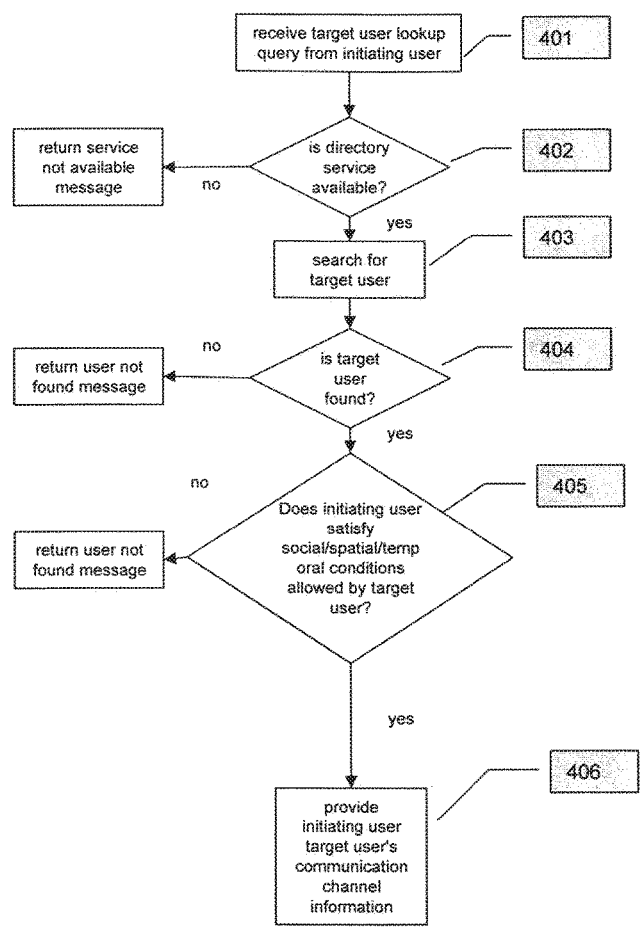
FIG. 4 illustrates an example method implemented by a directory service having spatiotemporal privacy features.

FIG. 4 illustrates an example method of a directory service having spatiotemporal privacy features. In some implementations, the social network system may track the locations of one or more users and store the location history in a data store. For example, users may use geo-social networking functionality to check in to various locations. In addition, a mobile client application hosted on a mobile device of a user may attach location information generated by a GPS module to messages transmitted from the mobile device 110 to the social networking system. In addition, the user may accept an invitation to an event having a known geographic location. As discussed below, this location history can be used in connection with directory service 107 to allow for various privacy settings with geographical and temporal aspects.

In particular embodiments, a mobile directory service client application hosted on a mobile device 110 may provide access to directory service 107. In particular embodiments, an initiating user may request a directory look up for a target user by providing the mobile directory service the target user's information (e.g., first and last name) and type of communication channel information requested (e.g., cell phone number or email address). In particular embodiments, the mobile directory service client application may automatically collect location information of the initiating user. For example, the initiating user's location can be determined by GPS or a mobile phone location tracking function of the initiating user's mobile device 110. In particular embodiments, the mobile directory service client application may communicate with directory service 107 and provide the target user's information and the initiating user's current location information (Step 401). In particular embodiments, if directory service 107 is not available, the mobile directory service client application may return a "service not available" message to the initiating user (Step 402). In particular embodiments, if directory service 107 cannot find the target user, the mobile directory service client application may return a "user not found" message to the initiating user (Step 403). In particular embodiments, directory service 107 may determine the target user's current location information. For example, the target user's location can be determined by GPS function on the target user's mobile device 110. In particular embodiments, directory service 107 may access a location history data store to determine the target user's and initiating user's past location information. For example, the location information can be based on a data store of check-in activity maintained by a geosocial networking service, an events service that allows users to configure and register attendance for events, status updates, calendar information and the like.

In particular embodiments, the target user may have one or more privacy settings that allows access to the target user's communication channel information only for user requests that can satisfy one or more social, spatiotemporal, geographic and/or temporal conditions defined by the one or more privacy settings. For example, the target user's privacy setting may allow access to the target user's cell phone number only for requesting users that are currently in the same vicinity (e.g. within 1 mile) as the target user. In such an embodiment, directory service 107 may compare the current locations of the initiating and target users. In other implementation, users may configure privacy settings that include one or more spatiotemporal aspects to allow access to contact information to users that have "crossed paths" with the target user. For example, a user may configure a privacy setting that allows access to contact information to users that were in the same geographic location (out to a configurable radius) at the same time as the user (within a configurable window of time) all within a configurable overall sliding window of time as measured from the request. Such privacy settings enable users to allow access to contact information to requesting users that met target users at a party or other social event in the recent past. In addition, the privacy settings can also include a social dimension, such as specifying a maximum degree of separation beyond which contact information may not be allowed. For example, the target user's privacy settings may allow access to the target user's cell phone number only for the target user's friends in the social networking system, but allow access to the target user's instant message ID for the users in the social networking systems who are friends of friends, and attended the same college (e.g., Stanford University) or were in the same city of the college (e.g., Palo Alto, Calif.) during the same years as the target user attended the college. In particular embodiments, if directory service 107 determines that the initiating user can not satisfy the social, spatial and temporal conditions defined by the target user's privacy settings, the mobile directory service client application may return a "user not found" message to the initiating user (Step 405). In particular embodiments, if access to the target user's communication channel information is allowed by the target user's privacy settings, the mobile directory service client application may provide the target user's communication channel information to the initiating user (Step 406).

Figure 5:
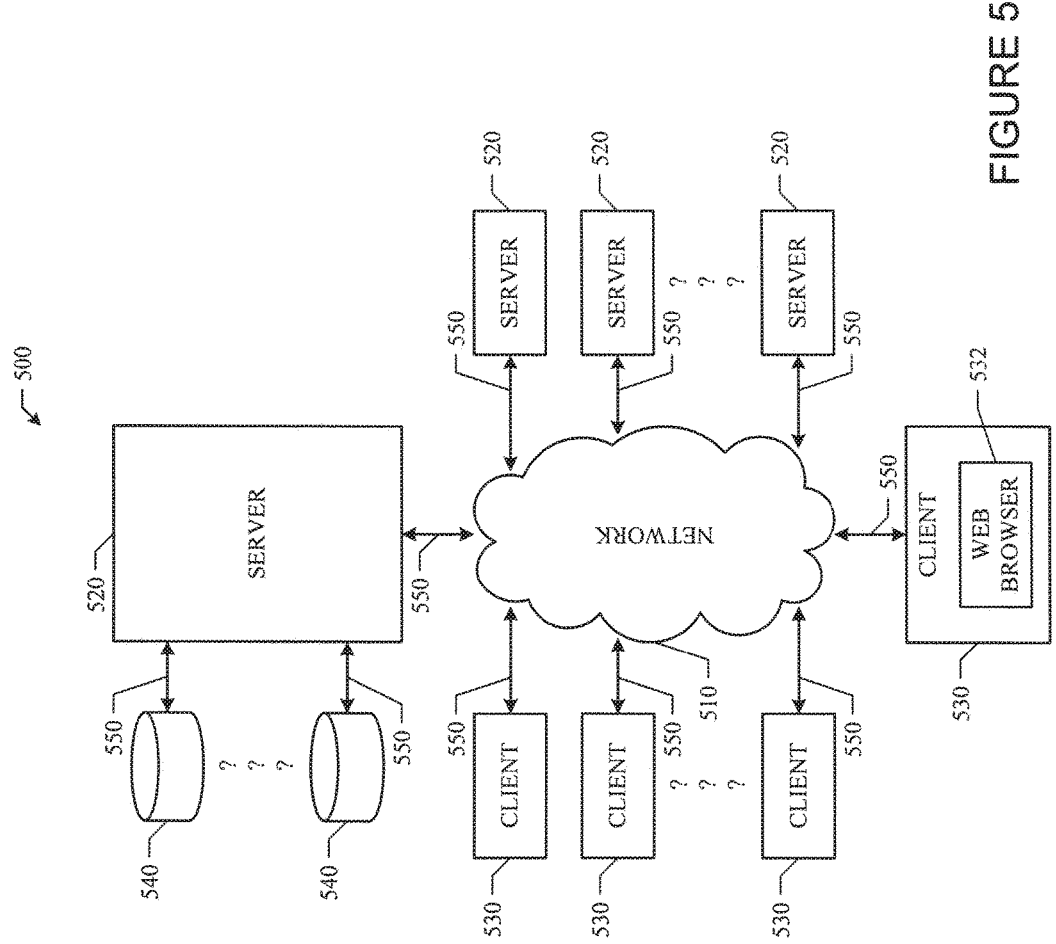
FIG. 5 illustrates an example network environment.

FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, directory service 107 and social networking system frontend 104 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. The present disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. The present disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more severs 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functionalities implemented or supported by client 530. For example and without limitation, a client 530 may be a desktop computer system, a notebook computer system, a netbook computer system, a handheld electronic device, or a mobile telephone. The present disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
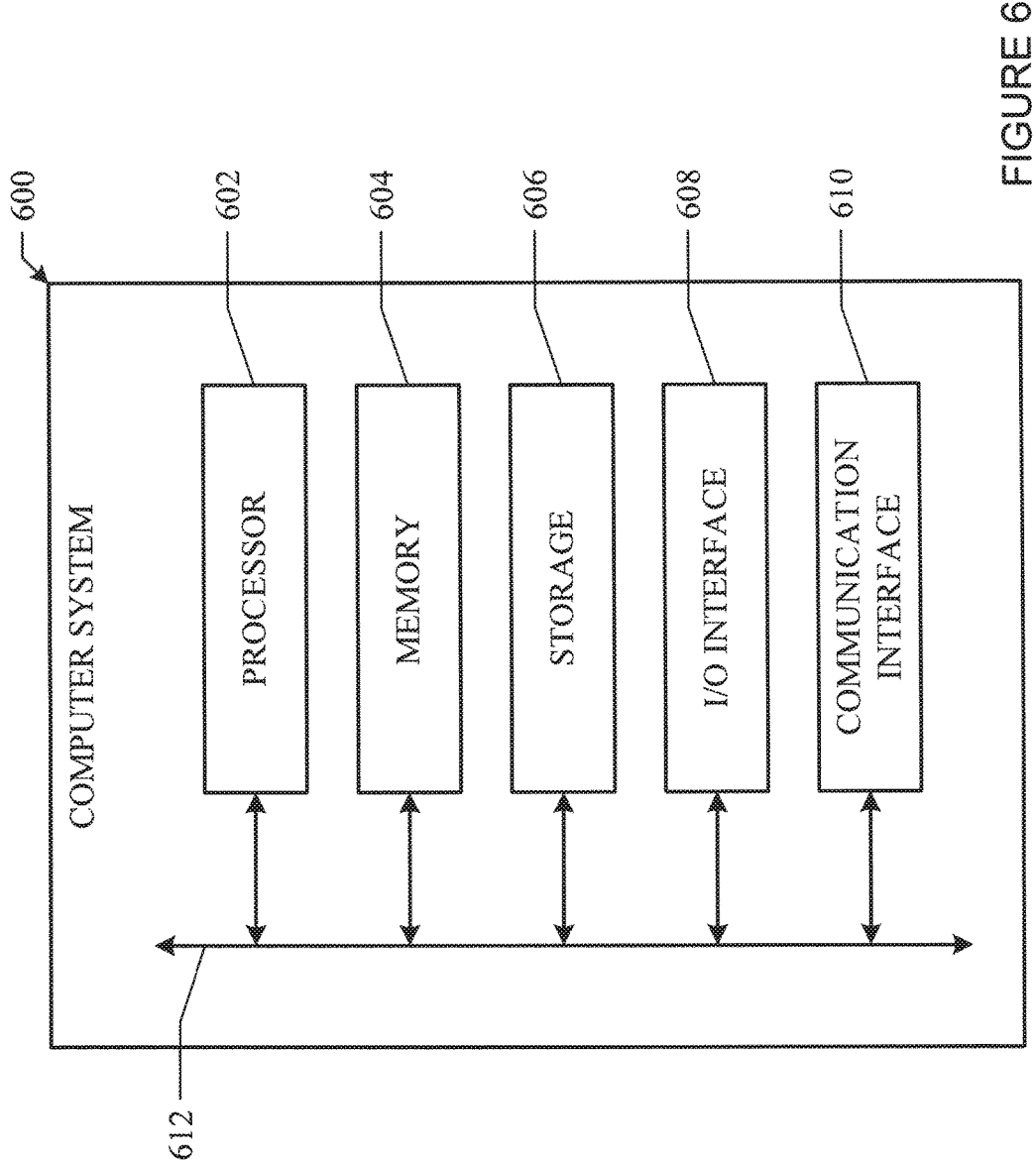
FIG. 6 illustrates an example computer system.

FIG. 6 illustrates an example computer system 600, which may be used with some embodiments of the present invention. For example, directory service 107 may be written in one or more software programs hosted on one or more computer systems 600. For example, mobile device 110 may include computer system 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. The present disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. The present disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate.

Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. §101. Herein, reference to a computer-readable storage medium excludes transitory forms of signal transmission (such as a propagating electrical or electromagnetic signal per se) to the extent that they are not eligible for patent protection under 35 U.S.C. §101.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   by one or more computing devices associated with a social-networking system, receiving from an initiating user a request for contact information of a target user;
   by one or more computing devices associated with a social-networking system, determining location information associated with the initiating user;
   by one or more computing devices associated with the social-networking system, determining that one or more privacy settings of the target user prevent the contact information of the target user from being provided to the initiating user, the privacy settings including one or more spatiotemporal conditions;
   by one or more computing devices associated with the social-networking system, determining whether one or more of the spatiotemporal conditions of the privacy settings allow for a communication session between the initiating user and the target user based on the location information associated with the initiating user; and
   by one or more computing devices associated with the social-networking system, in response to determining that one or more of the spatiotemporal conditions allow for the communication session between the initiating user and the target user, establishing an anonymous communication session between the initiating and target users, wherein contact information of the initiating user is presented to the target user in the anonymous communication session and contact information of the target user is hidden from the initiating user in the anonymous communication session.

2. The method of claim 1, further comprising:
   in response to the anonymous communication session ending, providing, from the social-networking system, an automatic prompt to the target user-to:
   create a social-networking relationship with the initiating user in the social-networking system, comprising:
   sending a friend request to the initiating user from the target user, or
   adding the initiating user to a white list associated with the target user, the white list configured to authorize further communication requests from the initiating user to the target user; or
   block the initiating user from the target user in the social-networking system.

3. The method of claim 1, wherein the location information associated with the initiating user is automatically determined by the social-networking system.

4. The method of claim 1, further comprising determining location information associated with the target user, wherein the spatiotemporal conditions of the privacy settings of the target user are determined based at least in part on the location information associated with the target user.

5. The method of claim 1, wherein the determining that one or more of the spatiotemporal conditions allow for the communication session between the initiating user and the target user further comprises:
   comparing a current location associated with the initiating user with a current location associated with the target user, and
   allowing for the communication session when a distance between the current location associated with the initiating user and the current location associated with the target user is less than or equal to a predetermined distance.

6. The method of claim 5, wherein the predetermined distance is set by the target user as part of the one or more spatiotemporal conditions of the privacy setting.

7. The method of claim 1, wherein determining the location information associated with the initiating user comprises accessing the location information from a data store associated with the social-networking system, or retrieving the location information as information attached to one or more previously messages transmitted from a computing device associated with the initiating user to the social-networking system.

8. One or more computer-readable non-transitory media embodying software that is configured when executed to:
at a social-networking system, receive from an initiating user a request for contact information of a target user;
at the social-networking system, determine location information associated with the initiating user;
at the social-networking system, determine that one or more privacy settings of the target user prevent the contact information of the target user from being provided to the initiating user, the privacy settings including one or more spatiotemporal conditions;
at the social-networking system, determine whether one or more of the spatiotemporal conditions of the privacy settings allow for a communication session between the initiating user and the target user based on the location information associated with the initiating user; and
at the social-networking system, in response to determining that one or more of the spatiotemporal conditions allow for the communication session between the initiating user and the target user, establish an anonymous communication session between the initiating and target users, wherein contact information of the initiating user is presented to the target user in the anonymous communication session and contact information of the target user is hidden from the initiating user in the anonymous communication session.

9. The media of claim 8, further comprising:
in response to the anonymous communication session ending, provide, from the social-networking system, an automatic prompt to the target user-to:
create a social-networking relationship with the initiating user in the social-networking system, comprising:
send a friend request to the initiating user from the target user, or
add the initiating user to a white list associated with the target user, the white list configured to authorize further communication requests from the initiating user to the target user; or
block the initiating user from the target user in the social-networking system.

10. The media of claim 8, wherein the location information associated with the initiating user is automatically determined by the social-networking system.

11. The media of claim 8, further comprising determining location information associated with the target user, wherein the spatiotemporal conditions of the privacy settings of the target user are determined based at least in part on the location information associated with the target user.

12. The media of claim 8, wherein the determining that one or more of the spatiotemporal conditions allow for the communication session between the initiating user and the target user further comprises:
comparing a current location associated with the initiating user with a current location associated with the target user, and
allowing for the communication session when a distance between the current location associated with the initiating user and the current location associated with the target user is less than or equal to a predetermined distance.

13. The media of claim 12, wherein the predetermined distance is set by the target user as part of the one or more spatiotemporal conditions of the privacy setting.

14. The media of claim 8, wherein determining the location information associated with the initiating user comprises accessing the location information from a data store associated with the social-networking system, or retrieving the location information as information attached to one or more previously messages transmitted from a computing device associated with the initiating user to the social-networking system.

15. A system comprising:
one or more processors; and
logic encoded in one or more computer-readable tangible storage media that, when executed by the one or more processors, is operable to:
at a social-networking system, receive from an initiating user a request for contact information of a target user;
at the social-networking system, determine location information associated with the initiating user;
at the social-networking system, determine that one or more privacy settings of the target user prevent the contact information of the target user from being provided to the initiating user, the privacy settings including one or more spatiotemporal conditions;
at the social-networking system, determine whether one or more of the spatiotemporal conditions of the privacy settings allow for a communication session between the initiating user and the target user based on the location information associated with the initiating user; and
at the social-networking system, in response to determining that one or more of the spatiotemporal conditions allow for the communication session between the initiating user and the target user, establish an anonymous communication session between the initiating and target users, wherein contact information of the initiating user is presented to the target user in the anonymous communication session and contact information of the target user is hidden from the initiating user in the anonymous communication session.

16. The system of claim 15, further comprising:
in response to the anonymous communication session ending, provide, from the social-networking system, an automatic prompt to the target user-to:
create a social-networking relationship with the initiating user in the social-networking system, comprising:
send a friend request to the initiating user from the target user, or
add the initiating user to a white list associated with the target user, the white list configured to authorize further communication requests from the initiating user to the target user; or
block the initiating user from the target user in the social-networking system.

17. The system of claim 15, wherein the location information associated with the initiating user is automatically determined by the one or more computing devices.

18. The system of claim 15, further comprising determining location information associated with the target user, wherein the spatiotemporal conditions of the privacy settings of the target user are determined based at least in part on the location information associated with the target user.

19. The system of claim 15, wherein the determining that one or more of the spatiotemporal conditions allow for the communication session between the initiating user and the target user further comprises:
   comparing a current location associated with the initiating user with a current location associated with the target user, and
   allowing for the communication session when a distance between the current location associated with the initiating user and the current location associated with the target user is less than or equal to a predetermined distance.

20. The system of claim 15, wherein the predetermined distance is set by the target user as part of the one or more spatiotemporal conditions of the privacy setting.

\* \* \* \* \*